Nov. 23, 1965　　　　H. BRÜNDLER　　　　3,219,081
COMMINUTING MACHINE FOR MEAT OR OTHER FOOD PRODUCTS
Filed Sept. 23, 1963　　　　　　　　　　　　7 Sheets-Sheet 1

INVENTOR.
HANS BRÜNDLER
BY
Mason, Kolehmainen, Rathburn and Wyss
ATTORNEYS.

Nov. 23, 1965 H. BRÜNDLER 3,219,081
COMMINUTING MACHINE FOR MEAT OR OTHER FOOD PRODUCTS
Filed Sept. 23, 1963 7 Sheets-Sheet 6

Nov. 23, 1965  H. BRÜNDLER  3,219,081
COMMINUTING MACHINE FOR MEAT OR OTHER FOOD PRODUCTS
Filed Sept. 23, 1963  7 Sheets-Sheet 7

United States Patent Office 3,219,081
Patented Nov. 23, 1965

3,219,081
COMMINUTING MACHINE FOR MEAT OR
OTHER FOOD PRODUCTS
Hans Bründler, Hardstrasse 70,
Zurich 4, Switzerland
Filed Sept. 23, 1963, Ser. No. 310,556
Claims priority, application Germany, Sept. 25, 1962,
B 68,965
24 Claims. (Cl. 146—182)

The present invention is concerned with a comminuting machine for meat or other comminutable foodstuffs and delicacies, etc. The machine has a cylindrical or tapered knife-head driven by a motor via a drive shaft. The outer cutting edges of the rotating part act together with the corresponding cutting edges of the non-rotating parts to perform the comminution. The machine has an input hopper, an inlet opening and an outlet opening.

In prior art machines of this general type the cutting edges of the knife-heads, as well as the cutting edges of non-rotating cutting tools, are arranged in such a way that they are mounted on cylindrical surfaces concentrically located with respect to the axis of the rotating drive shaft. In these machines it is impossible to adjust the distance between the cutting edges of the cutting tools with the cutting edges of the rigid parts. This disadvantage makes it difficult to control the production from the machine by varying the distance between the rotating and fixed cutting edges. In addition it is desirable to be able to adjust the latter distance in order to equalize wear and tear on the machine and to control the size of the particles delivered to the outlet.

A primary purpose of the invention is to avoid these disadvantages and to this end, the machine of the present invention is characterized by the fact that one or more steps of reduction are present, in which a cylindrical cagelike knife-head having inner and outer cutting edges is driven by a motor and is rotated against fixed, co-axially arranged, inner guide and cutting vanes. The inner cutting edges of the rotating knife-head cooperate with the inner guide and cutting vanes to rough cut the material to be comminuted while the outer cutting edges of the knife-head work together with the cutting edges of fixed, but axially adjustable outer cutting tools so as to fine cut material to be chopped. Furthermore, the outer cutting tools have radially oriented apertures through which the comminuted material flows from the inside to the outside radially. Furthermore, funnel-shaped rings are arranged between the individual steps of reduction to conduct the comminuted material from one stage to the inside of the knife-head of the next stage. Further, an impeller is mounted adjoining the last stage which acts like a radial blower to assist in moving the material through the individual stages by suction and which, in addition, discharges the comminuted material through the outlet opening.

The invention, both as to organization and manner of operation, together with further objects and advantages thereof, will best be understood by reference to the following detailed description taken in conjunction with the accompanying drawings, wherein.

Figures 1, 2:
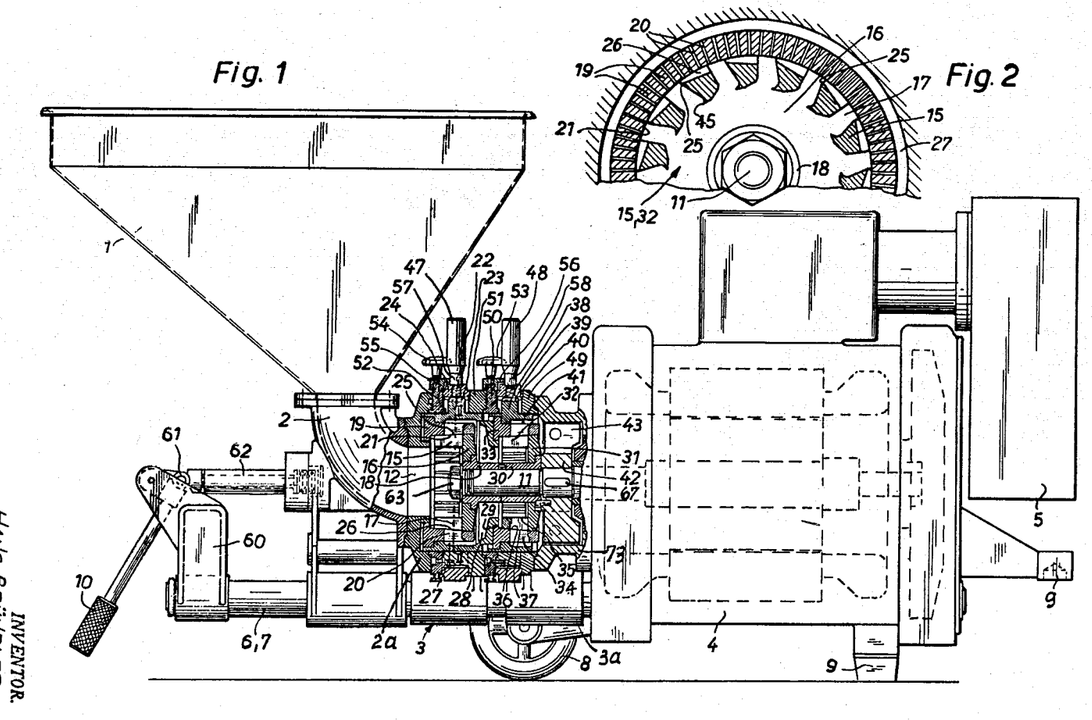
FIG. 1 is a sectional view of a device characterized by the features of the invention.
FIG. 2 is an enlarged, fragmentary, cross-sectional view taken along a line corresponding substantially to the line II—II in FIG. 1.
Figure 3:
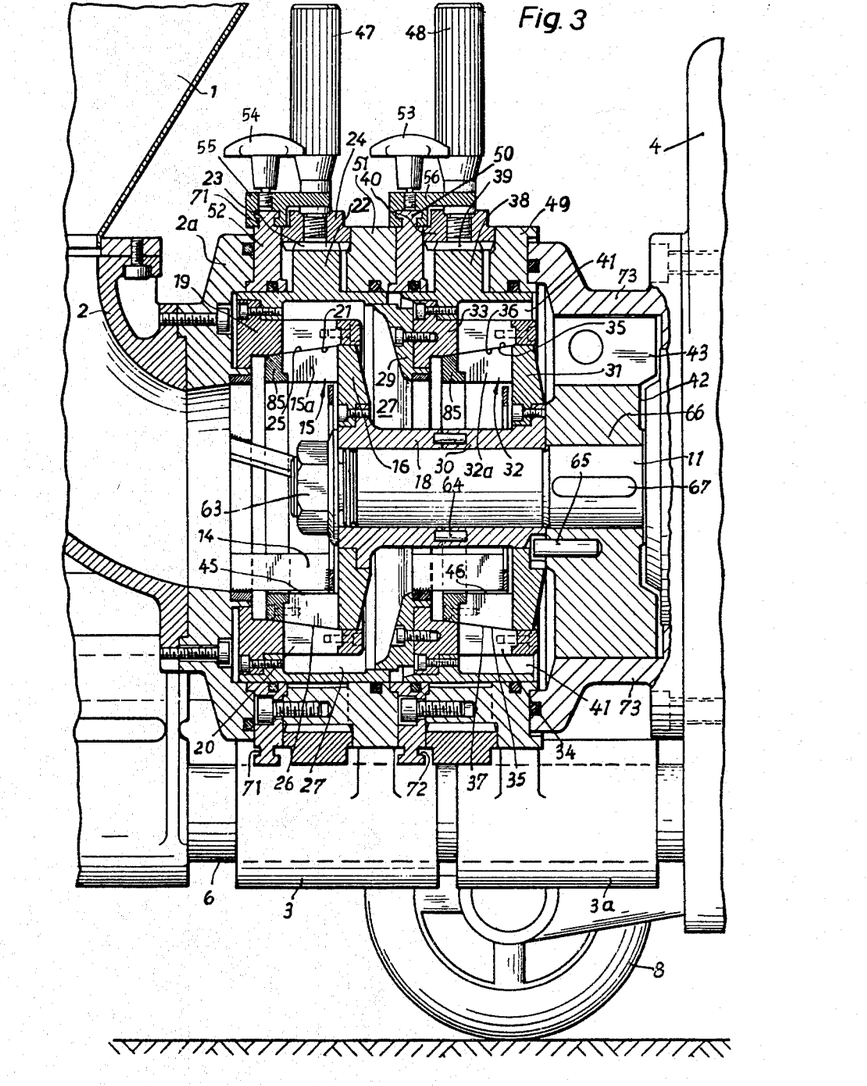
FIG. 3 is an enlarged, fragmentary view of a portion of the machine shown in FIG. 1.
Figure 4:
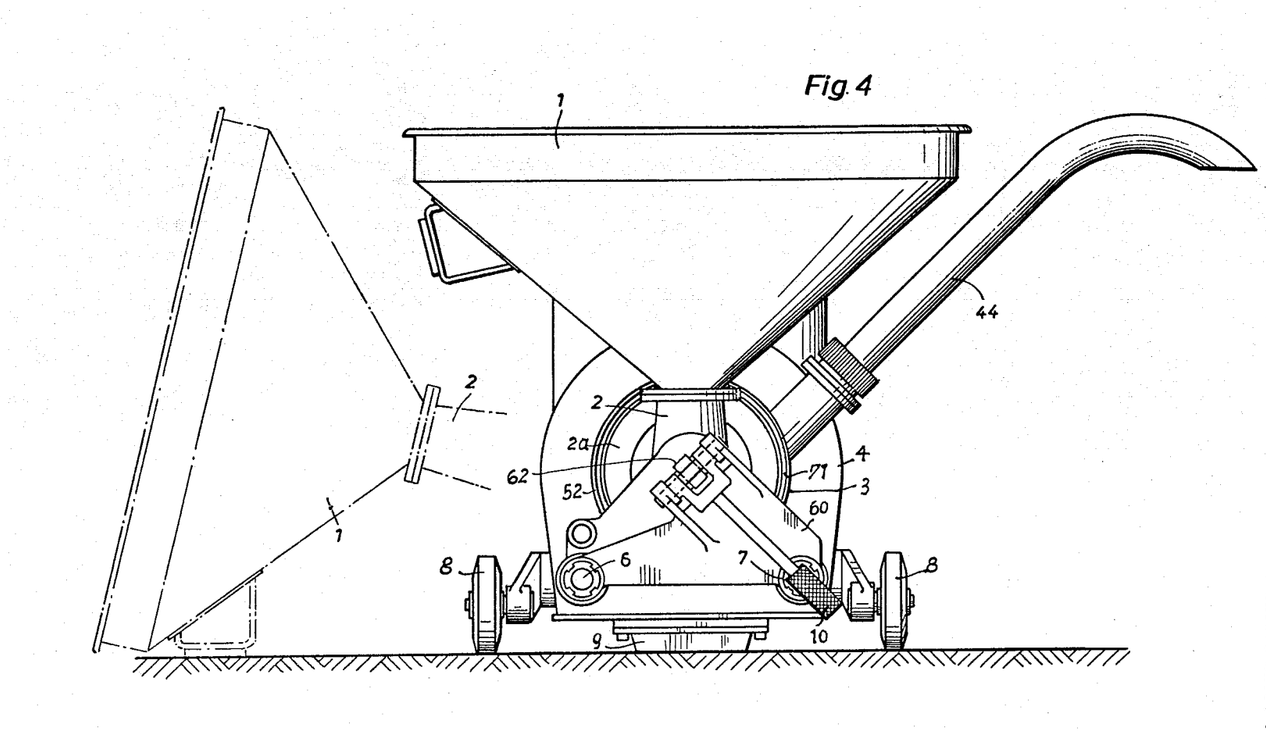
FIG. 4 is an end view of the device illustrated in FIG. 1 and shows the discharge tube.
Figure 5:
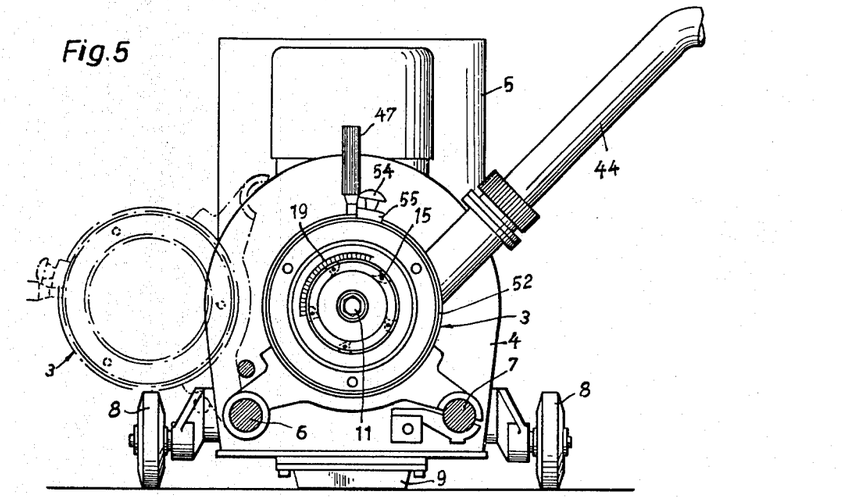
FIG. 5 is a transverse sectional view of the device illustrated in FIG. 1.

Referring now to the drawings and first to FIGS. 1, 2 and 3 the comminuting machine there shown includes an input hopper 1 into which meat or other material to be comminuted is poured. This input hopper 1 is attached to the upper end of a curved pipe elbow or throat 2 which is, in turn attached to a housing part or support 3. Adjacent to this housing part 3 is another housing part 3a and adjacent to the latter is a driving motor 4, which includes a switch box 5 of conventional construction for supplying power to the machine. On the left side of the motor 4 are attached two guiding bars 6 and 7 upon which are arranged, on one hand the housing parts 3 and 3a and, on the other hand, a movable sub-assembly including the input hopper 1, the elbow or throat 2 and a housing ring 2a. On the other side of the motor 4 is mounted a hitch g to facilitate transportation of the machine by towing. The entire machine stands on two casters or wheels 8 and a rubber foot 9. At the left end of the guide bars 6 and 7 is a bearing unit 60 upon which a lever 10 is supported for pivotal movement. This lever 10 carries a roller 61 acting upon the end of a bar 62 that is fixed to the elbow or throat 2. The purpose of this arrangement is to press the housing parts 3 and 3a and the movable sub-assembly formed by the input hopper 1, the throat 2 and the housing ring 2a towards the housing for the motor 4. The latter sub-assembly may be tilted about on one guiding bar 6 from the position shown in solid lines in FIGS. 4 and 5 to that shown in broken lines, thereby to permit access to these parts to to facilitate cleaning and maintenance.

The ring 2a has a central opening aligned with the outlet end of the throat 2. This central opening may be defined by walls which taper outwardly to form a widened mouth as shown in FIG. 3 although this widening of the mouth is not illustrated in FIG. 1. The ring 2a is suitably secured to a rim at the outlet end of the throat, for example, by spaced screws as shown in FIG. 3.

On a shaft 11, which is driven by the motor 4, are mounted two knife-heads 15 and 32 each of which includes a flange 16 or 31, respectively. Attached to each flange are a plurality of uniformly spaced knives 15a and 32a respectively, which essentially extend parallel to the shaft axis from the flange towards the throat 2. The flanges are screwed to hubs 18 and 30, respectively, which are fitted on the shaft 11 in end to end relationship and are held thereon by a nut 63 threaded onto the outer end of the shaft. In order to prevent these hubs 18 and 30 from turning with respect to the shaft 11, they are connected to each other through a set of spaced pins 64 shown in FIG. 3 and, in addition, the hub 30 is connected through another set of pins 65 for rotation with the hub of an impeller 42, which is described hereinafter. The hub 66, in turn, may be secured by a key or spline 67 to prevent twisting of all three hubs about the shaft 11.

Each of the knifes 15a and 32a of the knife-heads 15 and 32, respectively, has an inner cutting edge identified by the numerals 25 and 35 in FIG. 3 and an outer cutting edge identified by the numerals 45 and 46. FIG. 2 shows a cross section of the knives which are identical in the two sets or knife heads. The inner cutting edges 45 and 46 are provided for pre-cutting of the material to be comminuted. The outer cutting edges 25 and 35 coact with cutting edges 21 and 36 formed on a pair of tapered rings or shells 19 and 33, respectively, which form non-rotating cutting tools. The rings 19 and 33 have radial apertures 20 and 34, respectively, and the inner, sharpened edges of these apertures form the cutting edges 21 and 36. Ring gaps 26 and 37, best shown in FIG. 3 are formed between the cutting edges 25 and 35 of the rotating cutting tools or knife heads 15 and 32, on the one hand, and the cutting edges 21 and 36 of the fixed rings 19 and 33 on the other hand. The size of each of these ring gaps is adjustable and the manner in which the adjustment is made is described hereinafter.

As is shown in FIGS. 1 and 3, the fixed cutting rings 19 and 33 are attached to a pair of guiding rings 22 and 38, respectively, by means of a plurality of spaced screws. The guiding are dimensioned to provide ring spaces 27 and 41, respectively, between the outer peripheries of the rings 19 and 33 and the inner faces of the guiding rings 22 and 38. The guiding ring 22 is disposed between two housing rings 52 and 51 while the ring 38 is located between another pair of rings 50 and 49. The ring 51 is an integral part of the housing piece 3 while the ring 49 is an integral part of the housing piece 3a. The rings 52 and 50 are respectively secured to the rings 51 and 49 by means of screws which thread into three spaced fingers extending from the rings 51 and 49 towards the throat end of the machine. One of these fingers of each ring is visible at the bottom of FIG. 3. These pairs of housing rings are spaced to permit adjustment of the guiding rings 22 and 38 in an axial direction to control the dimensions of the ring gaps 26 and 37. To effect the adjustment of guiding rings 22 and 38 these rings are provided with outer threaded collars 23 and 39 which mesh with internal threads formed on a pair of adjustment rings 24 and 40 respectively. Each of these adjustment rings 24 and 40 can be turned about the axis of the shaft 11 but neither can be moved axially with respect to the aforementioned pairs of housing rings 52 and 51 or 50 and 49, respectively. The guiding rings 22 and 38, on the other hand, can be moved to a limited extent axially of the shaft 11 but they cannot be turned about this axis because they are provided with three spaced recesses in their periphery respectively for accommodating the above described three spaced fingers on the rings 51 and 49. The intermeshing teeth on the members 23 and 24 and those on the members 39 and 40 are suitably shaped to provide a force component producing axial movement of the guiding rings 22 and 38 when the outer adjusting rings are turned. For example, these gear teeth may be of the herringbone type to produce a wedging or camming action for moving the guiding rings axially. In order to permit turning of the adjustment rings 24 and 40 by hand these rings are respectively equipped with handles 47 and 48.

In order to secure the adjustment rings 24, 40 against unintentional rotation, a pair of clamps 55 and 56 are respectively attached to the handles 47 and 48. These clamps are movable about the periphery of the housing rings 52 and 50 and can be locked in any desired position by locking nuts 53 and 54. To guide the movement of the clamps, each is provided with a groove for accommodating tongues 71 or 72 respectively formed at the periphery of the rings 52 and 50. When the nut 53 or 54 is tightened its associated clamp 55 or 56 is locked to prevent the handle 47 or 48 from being turned. The locking nuts 53 and 54 are operable independently to permit independent adjustment of each stage of the machine.

Between the knife-heads 15 and 32 is a funnel-shaped ring 29 which serves as a baffle at the outlet side of the ring space 27 and directs material from the first cutting stage to the next. A radial pump is located between the motor 4 and the cutting heads 15 and 32 and this pump includes the impeller 42 having one or more fins 43 extending radially outward. As was indicated above, the hub 66 of the impeller is keyed to the shaft 11 by a spline or key 67. The impeller is located within a housing cylinder 73 to which a discharge tube 44 (FIGS. 4 and 5) is attached.

In FIG. 3 are illustrated a set of additional fixed inner guiding and cutting tools or vanes 14 but these have been omitted from FIG. 1 in order to avoid obscuring other details. These vanes are attached to the housing ring 2a in such manner that they can be readily detached. Specifically, the vanes 14 are welded or otherwise secured to a ring which seats within an annular recess at the outer end of the ring 2a and which is held against rotation in any suitable manner. The vanes extend from the ring towards the first cutting head 15 and lie adjacent the inner cutting edges 45 of the knives of the head 15. These vanes coact with the inner cutting edges 45 to form a rough cutter of the material to be reduced. The outer ends of the vanes are also joined by a reinforcing ring which lies adjacent but is spaced from the flange 16. A similar pair of rings and set of vanes are provided for the second stage as is shown in FIG. 3 where the vanes are illustrated as lying adjacent the cutting edges 46.

To disassemble parts of the machine for cleaning or maintenance the lever 10 may be pivoted until the roller 61 no longer engages the post 62 whereupon the movable subassembly formed by the hopper 1, the throat 2 and the ring 2a may be moved along the rods 6 and 7 away from the housing parts 3 and 3a. The outer flat face of the ring 2a seats against an inner flat end face on the part 3 and an O-ring is disposed therebetween to prevent leakage of material. These faces are not otherwise joined and, hence, the subassembly may be moved away from the housing parts until the cage formed by the vanes 14 and its two end rings is withdrawn from the housing part 3 whereupon the subassembly may be pivoted about the rod 6 to the position shown in broken lines in FIG. 4. The cutting parts of the first stage and the elements of the movable subassembly are then accessible for cleaning or repair. Further disassembly may be effected by moving the housing part 3 and its attached components including the guiding ring 22, the tapered shell 19, the adjusting ring 24 and the housing ring 52 along the guide rods 6 and 7 toward the left as viewed in FIG. 1 until all of these parts can be pivoted about the rod 6 to the position shown in broken lines in FIG. 5. The nut 63 may be removed to permit removal of the cutting heads 15 and 32 and the expeller 42. The housing part 3 has an outer end face seating against an inner end face on the housing ring 50 but these faces can be separated during the disassembly. Similarly, the part 3a has an outer end face seating against a flat inner end face on the cylindrical housing 73. An O-ring is disposed between the latter faces as shown in FIG. 3 but these two faces can be separated to permit the housing part 3a and its attached components including the ring 49, the housing ring 50, the adjusting ring 40, the guiding ring 38, the funnel ring 29, the vane cage of the second stage and the tapered shell 38 to be moved along the rods 6 and 7 towards the left. When these parts are clear of the shaft 11 they too may be pivoted about the rod 6.

During the operation of the comminuting machine shown in FIGS. 1 to 5 the material to be comminuted is filled or loaded into the input hopper 1. This material moves through the throat 2 to the cutting stages both as a result of gravity and also because of the suction of the radial pump including the expeller 42. In the first cutting stage, the material to be chopped is precut by the inner cutting edges 45 of the knives 15a coacting with the vanes 14 and the material is further reduced between the outer cutting edges 21 of the ring 19, whereupon it is pressed through the apertures 20 in the ring 19. The tapered face of the knives joining the edges 25 and 45 provides a propelling force to press the material against the ring 19 and force it through the apertures 20. After being pressed through these apertures 20 the material flows into the ring space 27 and from there is guided by the funnel-shaped ring 29 into the next cutting stage. In this second stage of operation, the chopped material is again pre-cut by the inner cutting edges 46 of knives 32a coacting with its associated vanes to provide a rough cut. Thereafter the material is further reduced between the outer cutting edges 35 of the knives 32a and the cutting edges 36 of the second ring 33. Again it is pressed through the apertures 34 of the second ring 33 by the tapered face of the knives 32a joining the edges 35 and 46. After being pressed through the apertures 34, the material flows into the second ring space 41 and from there to the impeller 42 of the radial pump. The finished finely chopped material is pumped out of the machine through the discharge tube 44 and is received in a container which is not shown in the drawing.

The desired degree of comminution of the material in the first stage is controlled by the size of the apertures 20 in the stator part or ring 19 and also may be varied by adjusting the ring gap 26 in the manner described above. The degree of comminution in the second stage is controlled by the size of the apertures 34 and may again be varied by adjustment of the ring space or gap 37. The adjustment of the ring gaps is accomplished by manually rotating the adjusting rings 24 and 40, respectively, by means of the handles 47 or 48. The rotation of the adjustment rings 24 and 40 results in a displacement of the guiding rings 22 and 38 in one or the other axial direction depending on the direction of rotation. These adjustment rings are engaged with the rings 19 and 33, respectively, by means of the threads 23 and 39. As a consequence, the distance between the outer cutting edges 25, 35 of the rotating knives 15a and 32a and the cutting edges 21, 36 of the rings 19 and 30 is increased or diminished due to the fact that each of these sets of cutting edges is formed upon a tapered shell.

The adjustment of the two working stages is effected independently of each other. The invention can be realized for two-stage machines with cutting sets arranged one following the other in series as well as for machines in which cutting sets, formed in the same manner, are arranged co-axially. Co-axially means that one cutting set surrounds the other one in the same plane like a ring, such that the material does not have to be rerouted in its direction when it discharges during the various cutting phases. It moves radially from the inside cutting stage to an outside cutting stage.

The size of the apertures 20 in the first, non-rotating cutting ring 19 is purposely kept larger than the apertures 34 in the second non-rotating cutting ring part 33, in order that the material to be chopped can be cut coarser in the first stage of operation, where it is chopped to a somewhat larger grain size whereupon in the second stage of operation it is then reduced to the desired degree of fineness. Moreover, it is preferable that the ring gap 26 of the first cutting stage be adjusted so that it is somewhat larger than the ring gap 37 of the second stage.

Figure 6:
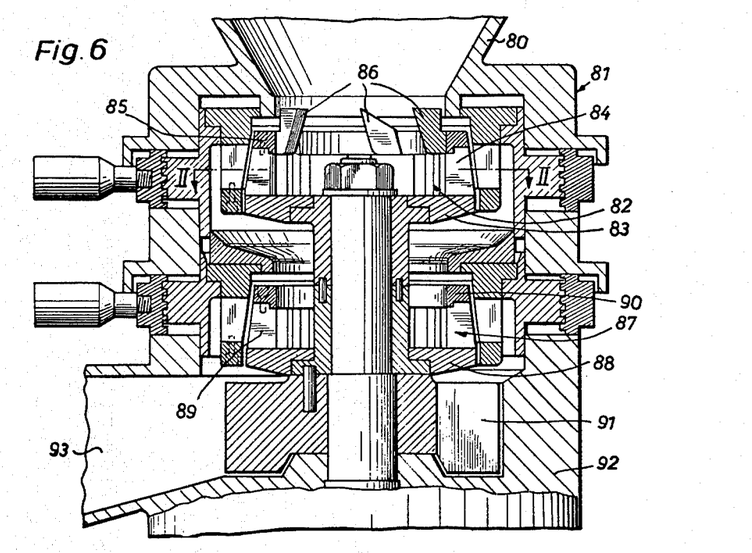
FIG. 6 illustrates a second embodiment of the invention arranged vertically and shows an axial section.

The embodiment illustrated in FIG. 6 is distinguished from that shown in FIGS. 1 to 5 essentially by its vertical arrangement in a manner such that an input funnel 80 can be formed directly upon the top of a housing 81. A first cutting tool 82 includes a ring 85 attached to the upper ends of a set of knives 84 having their lower ends secured to a flange 83. Several wing-shaped knives 86 are attached to the ring 85 and these knives are likewise provided for precutting of the material to be reduced. Another ring 90 is fixed also to the upper ends of a set of knives 89 of a second rotating cutting tool 87. The lower ends of these knives 89 are attached to a flange 88. An impeller 91 of a radial pump is located within a housing 92 which instead of a discharge tube, can have a discharge opening 93. Remaining parts of this second embodiment are similar to those of the first embodiment but differ in construction details.

Each cutting stage includes a tapered, fixed cutting tool or shell which can be adjusted axially to alter the spacing between the outer edges of the knives and the cutting edges of the apertured shell. A funnel-like guide or baffle is disposed between the two cutting stages and a motor at the bottom of the machine drives the shaft carrying the two rotary cutting tools.

Figure 7:
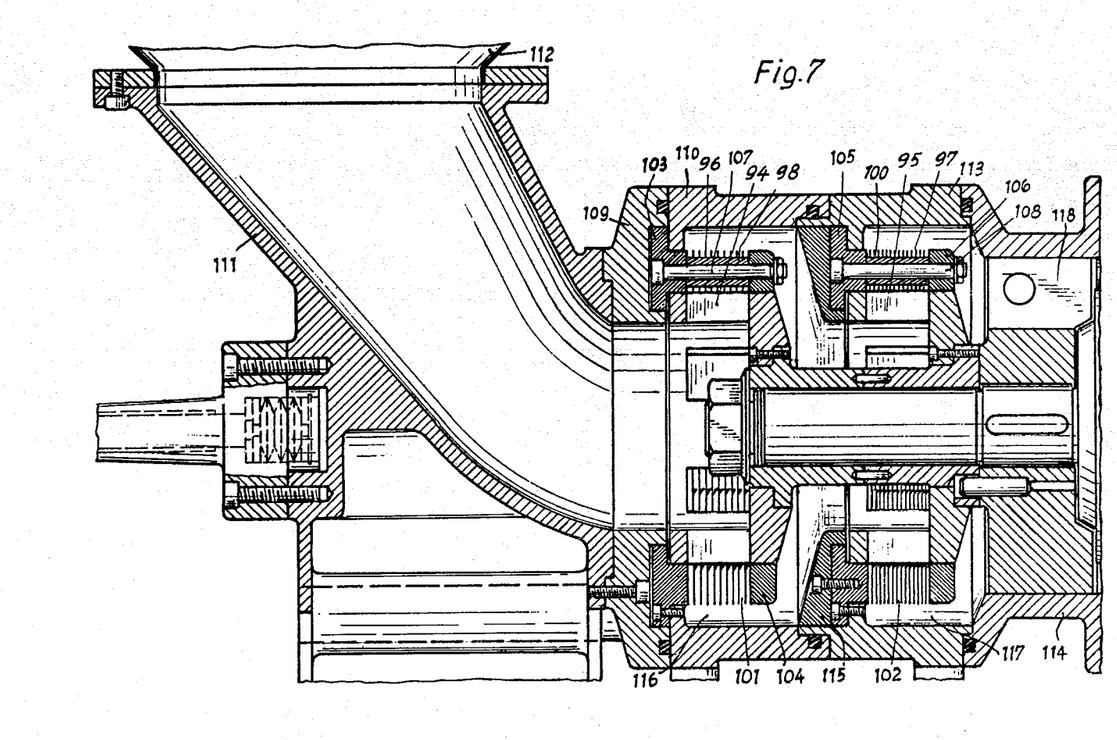
FIG. 7 illustrates a third embodiment of the invention arranged horizontally and also shows an axial section.

In the third embodiment shown in FIG. 7 a horizontal comminuting machine has a pair of rotating knife-heads 94 and 95 surrounded by sets of stationary annular ring knives 96 and 97 in which the knives of each set are arranged side by side. The annular knives of each set are held in position by means of several bolts and intermediate spacers or washers 98 and 100 disposed between the individual knives. Between the knives are formed radially oriented apertures or spaces 101 and 102. The annular knives and the spacers are packaged between two flanges 103 and 104 or 105 and 106, respectively, and are clamped together by bolts 107 and 108, respectively. As a result a unitized set of cutters is formed which, as a unit, can be taken out but is held against rotation by screws or the like threaded into the machine housing. The flange 103 rests in a recess in a housing 109 which carries the pipe elbow or throat 111. The flange 103 is screwed to a housing part 110. The throat 111 is attached to a funnel or hopper 112. Connected with the housing part 110 is another housing part 113 to which a pump housing 114 connects. Flange 104 is located adjacent a funnel-shaped ring 115, which serves to guide material from the first cutting stage to the second. Numerals 116 and 117 identify ring spaces surrounding the cutting sets and numeral 118 indicates the impeller.

Spacers 98 and 100 may, for example, be of rectangular shape in which the inner edges extend up to the inner diameter of the annular knives 96 and 97, respectively. As a result, the radially-running apertures 101 or 102 or edges formed in the packaged circular knives, extend radially perpendicular, that is, transverse to the axis of rotation. As can be seen from FIG. 7, the knives of the first cutting stage are spaced farther apart than those of the second cutting stage since the first stage has thicker spacers 98. Transfer openings or apertures 101 and 102 can be made wider or narrower if wider or narrower spacers 98 and 100 are used.

Figures 8, 9:
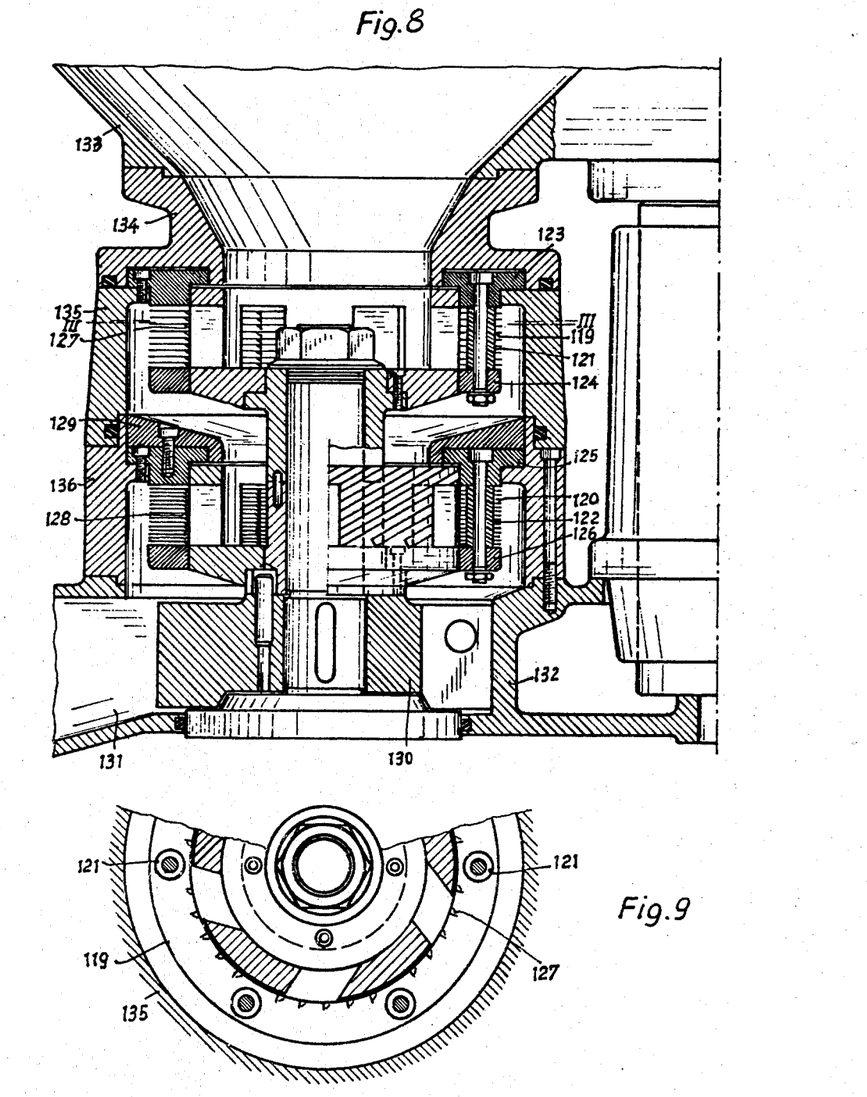
FIG. 8 illustrates a fourth embodiment of the invention arranged vertically and also shows an axial section.
FIG. 9 is a fragmentary cross-sectional view taken along a line corresponding substantially to the line III—III in FIG. 8.

In a fourth embodiment shown in FIG. 8, again fixed annular knives in two cutting stages, one above the other, are employed. This is, in effect, a chopping or comminuting machine with a vertical arrangement. The annular knives 119 and 120 shown in FIG. 8 are also packaged with spacers 121 and 122 between flanges 123, 124 or 125, 126, respectively. Annular knives 119 and 120 are shown with punches of protuberances along the inner edge which result in points 127, 128 that are bent down and incline downwardly toward the axis of rotation. These points may be of any desired length depending upon the distance between adjacent ones of the annular knives. Preferably, however, they touch the next adjacent knife at a point in the intermediate space between the punches on the latter knife. Numeral 129 indicates the funnel ring 130, the impeller 131 and the dischare opening in the pumping housing 132. The hopper 133 is located on a housing ring 134 which is connected with a housing part 135 of the first cutting stage, which in turn is attached to housing part 136 of the second cutting stage.

Figure 10:
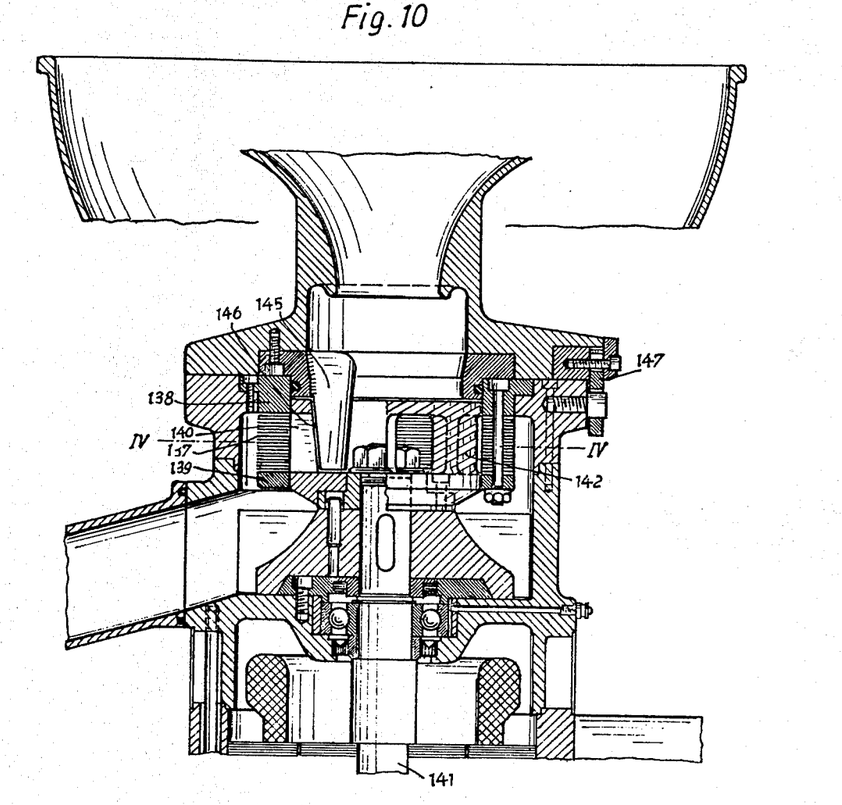
FIG. 10 illustrates a fifth embodiment of the invention arranged vertically and having only one cutting step which is shown in axial section.
Figure 11:
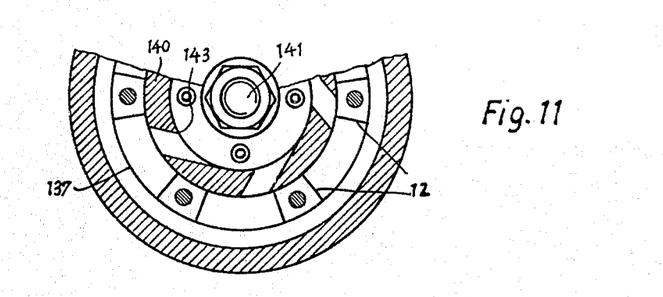
FIG. 11 is a cross-sectional view taken along a line corresponding substantially to line IV—IV in FIG. 10.

The last embodiment shown in FIGS. 10 and 11, comprises a vertical machine with only one cutting stage. This machine again includes packaged annular knives 137 located between two flanges 138 and 139. A rotating knife-head 140 which rotates within the circular knives 137 includes a locking device 142 which is located at the outer diameter and which runs at an angle to the drive shaft 141. This locking device runs opposite to the cutting edges of the circular knives 137 and it works in conjunction with them. In similar manner, as in the first embodiment, the inner cutting edges 143 of the rotating knife-head 140 cooperate with a set of fixed inner guide and cutting vanes 145 to form rough cutters for the material to be chopped. A gap 146, which is formed on one hand by the tapering cutting edges 143 of the rotating knife-head 140 and on the other hand by the fixed guide and cutting vanes 145, can be varied by axial displacement of the latter vanes by means of an adjusting device 147.

The annular knives of the last three embodiments may have a sawtooth or wave-shape along their internal diameter.

The inner and outer edges of the rotating knife-head can have interchangeable blades at their front edges.

The input vanes taper off in a conical way towards the cutting tools. This is advantageous in order to effect a non-turbulent, uniform flow of the material.

It is possible to use fixed annular knives in each cutting stage the internal diameters of which increase gradually in the flow direction of the material and also employ within these circular knives, a rotating knife-head carrying correspondingly adjusted knives standing at an angle. For the purpose of changing the air gap width between the cutting tools the annular knife set may be axially adjustable. In such a knife set the knife-head 15 of the first example could, for example, rotate and the adjustment shown in FIGS. 1 to 5 could be employed for the outer annular knife set.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. A comminuting machine for meat or other material, said machine comprising a shaft, a motor driving said shaft, a knife head mounted on said shaft, said knife head having a plurality of knives each including an outer cutting edge, a fixed cutting element surrounding said knife head and having cutting edges coacting with and spaced from the outer edges of the knives, a hopper having an inlet opening, means defining a discharge chamber having an outlet opening, said knives having inner cutting edges, a plurality of fixed, co-axially arranged, inner guide and cutting tools adjacent said inner cutting edges of said knife-head and co-operating with said inner cutting edges to rough cut the material to be comminuted, said outer cutting edges of said knives coacting with said cutting edges of said fixed cutting element to perform a fine cutting on the material to be comminuted, said fixed cutting element having radially oriented openings therein through which the comminuted material moves from the inside radially to the outside, an impeller in said discharge chamber mounted on said shaft for causing material to flow by suction through the machine and for discharging the comminuted material through the outlet opening.

2. A comminuting machine according to claim 1, further including means for adjusting the outer cutting element axially along the axis of rotation of the shaft, said element being so constructed and arranged that the axial adjustment alters the spacing between said element and said outer cutting edges of the knives.

3. A comminuting machine according to claim 2 wherein said adjusting means comprises an externally threaded member on said fixed cutting element and an outer ring having teeth meshing with said member and surrounding said element, means for preventing rotation of said element about said shaft but permitting axial adjustment thereof, said teeth being constructed and arranged to move said element axially when said ring is turned.

4. The apparatus defined by claim 1 wherein the material passing through said openings is directed to a second cutting stage including a rotary knife head driven by said shaft, the latter knife head having a plurality of knives each including an inner cutting edge and an outer cutting edge, a plurality of fixed cutting and grinding tools adjacent the last named inner cutting edges and coacting therewith to rough cut material, and a fixed cutting element surrounding the last mentioned knife head and having cutting edges thereon coacting with the last named outer cutting edges to fine cut the material, the last mentioned cutting element having apertures extending radially therethrough for permitting the flow of material from the last named knives.

5. A comminuting machine according to claim 4 wherein the second cutting stage is located vertically below the hopper and below the first mentioned knife head and the first mentioned cutting element.

6. Apparatus according to claim 4 wherein the second cutting stage is displaced axially along the shaft from the first mentioned knife head and wherein a baffle plate is provided for directing material into the second cutting stage after it has passed through the openings of the first mentioned fixed cutting element.

7. Apparatus according to claim 1, wherein knives are fixed at one end on a flange carried by the shaft, and a ring connecting the other ends of the knives.

8. Apparatus according to claim 1 further including a throat, a hopper mounted on said throat, two guiding bars slidingly supporting said throat and hopper in such manner that the throat and hopper can be tilted about one of said bars.

9. Apparatus according to claim 8 wherein said machine includes a housing for the knife head formed by a housing part that is mounted for sliding movement along said bars and can be tilted around one of said bars.

10. Apparatus according to claim 9 further including a mechanism acting on said throat to normally urge said throat towards said housing part.

11. Apparatus according according to claim 1 characterized by the fact that the outer cutting edges of said knives are arranged at an angle to the axis of rotation of the shaft.

12. A comminuting machine according to claim 11, further including means for adjusting the outer cutting element axially along the axis of rotation of the shaft, said element being so constructed and arranged that the axial adjustment alters the spacing between said element and said outer cutting edges of the knives.

13. A comminuting machine according to claim 12 wherein said adjusting means comprises an externally threaded member on said fixed cutting element and an outer ring having teeth meshing with said member and surrounding said element, means for preventing rotation of said element about said shaft but permitting axial adjustment thereof, said teeth being constructed and arranged to move said element axially when said ring is turned.

14. Apparatus according to claim 1 wherein the apertures in the cutting element are oriented at an angle with respect to a plane extending normal to the axis of the shaft.

15. A comminuting machine according to claim 1 wherein the cutting element and the knife head are detachable to permit cleaning.

16. Apparatus according to claim 1 wherein the guide and cutting tools are detachably secured to the throat.

17. A comminuting machine according to claim 1 characterized by the fact that the fixed cutting element comprises annular, spaced apart knives, the spaces between the knives forming apertures extending transversely of the axis of the shaft.

18. Apparatus according to claim 17 wherein the knives are spaced apart by means of spacers of rectangular shape, said spacers having inner edges extending up to the internal diameter of the stationary, annular knives to form radially perpendicular openings which are transverse to the axis of rotation of the shaft.

19. A comminuting machine according to claim 17, wherein the annular knives have punched portions along their internal diameter forming bent points extending towards an adjacent knife, said points being of such length that they touch the next adjacent knife.

20. A comminuting machine according to claim 17 wherein the annular knives at their internal diameter have a sawtooth shape.

21. A comminuting machine according to claim 17 wherein internal diameters of the annular knives expand gradually in the flow direction of the material between said inlet opening and said outlet opening.

22. A comminuting machine according to claim 1, wherein the annular knives are held together in a package with spacers separating the individual knives, a pair of leaves at opposed ends of the package, and a plurality of centering screws extending between said flanges.

23. Apparatus according to claim 22 wherein means are provided for adjusting the position of the package of annular knives axially of the drive shaft to control the air gap between the cutting element and the knife head.

24. A comminuting machine according to claim 1, wherein the inner and outer edges of the rotating knife head have at their inner edges interchangeable blades.

References Cited by the Examiner

UNITED STATES PATENTS

| 2,987,090 | 6/1961 | Urschel | 146—192 X |
| 3,076,487 | 2/1963 | Illsley | 146—182 |

FOREIGN PATENTS

| 239,168 | 6/1962 | Australia. |
| 1,145,902 | 3/1963 | Germany. |
| 1,148,734 | 5/1963 | Germany. |

J. SPENCER OVERHOLSER, *Primary Examiner.*